N. JOHNSON.
Machines for Rolling and Marking Saw-Teeth Blanks.

No. 147,136. Patented Feb. 3, 1874.

WITNESSES.
Francis L. Durand
C. L. Evert.

INVENTOR
Nelson Johnson
Alexander Mason
By Attorneys.

2 Sheets--Sheet 2.

N. JOHNSON.
Machines for Rolling and Marking Saw-Teeth Blanks.

No. 147,136. Patented Feb. 3, 1874.

WITNESSES.
Francis L. Durand
C. L. Evert

By

INVENTOR
Nelson Johnson
Alexander Mator

Attorneys.

UNITED STATES PATENT OFFICE.

NELSON JOHNSON, OF JASPER, NEW YORK.

IMPROVEMENT IN MACHINES FOR ROLLING AND MARKING SAW-TEETH BLANKS.

Specification forming part of Letters Patent No. 147,136, dated February 3, 1874; application filed October 30, 1873.

*To all whom it may concern:*

Be it known that I, NELSON JOHNSON, of Jasper, in the county of Steuben and in the State of New York, have invented certain new and useful Improvements in Machines for Rolling and Laying Off Saw-Teeth; and do hereby declare that the following is a full, clear, and exact description thereof, reference being had to the accompanying drawings, and to the letters of reference marked thereon, making a part of this specification.

The nature of my invention consists in the construction and arrangement of a machine for rolling and laying off saw-teeth, as will be hereinafter more fully set forth.

In order to enable others skilled in the art to which my invention appertains to make and use the same, I will now proceed to describe its construction and operation, referring to the annexed drawings, in which—

Figure 1:
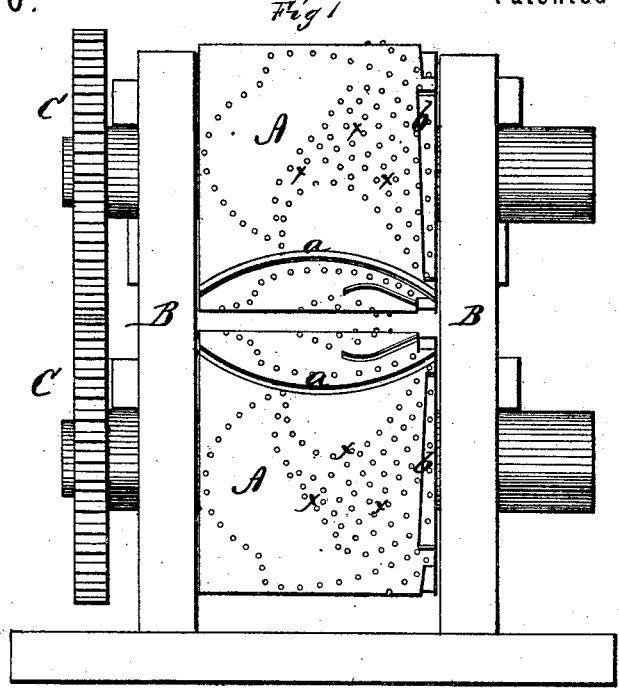
Figure 2:
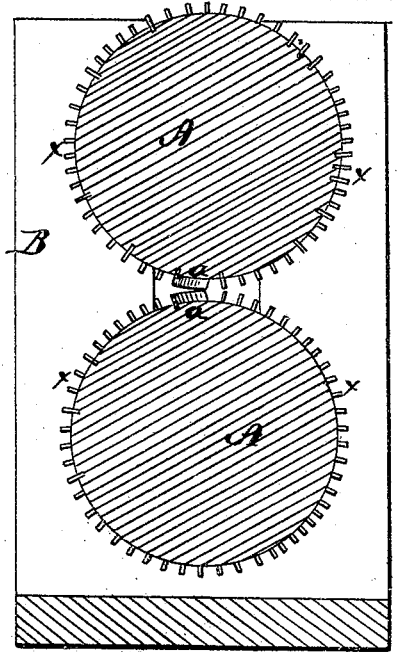
Figure 3:
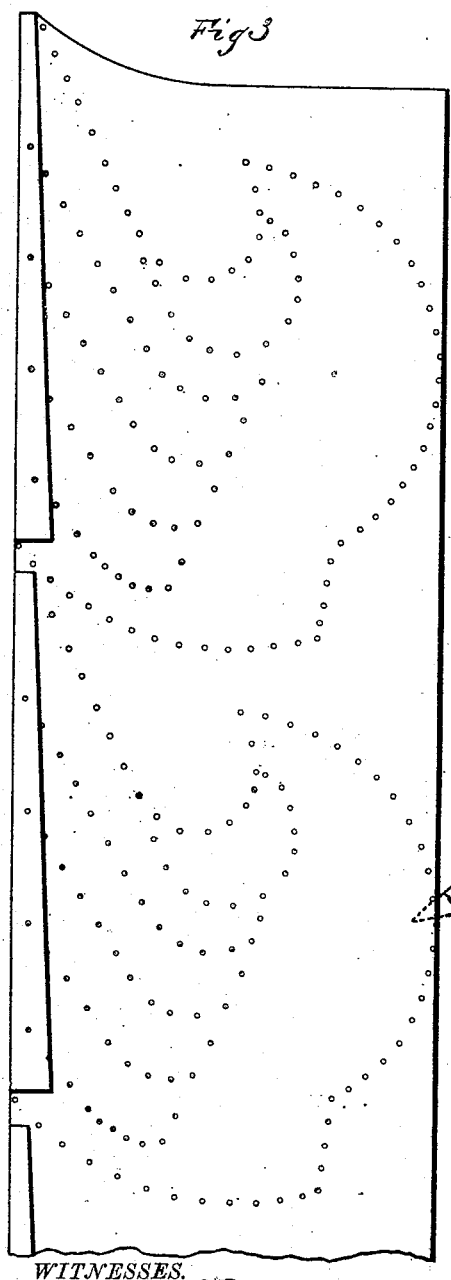
Figure 4:
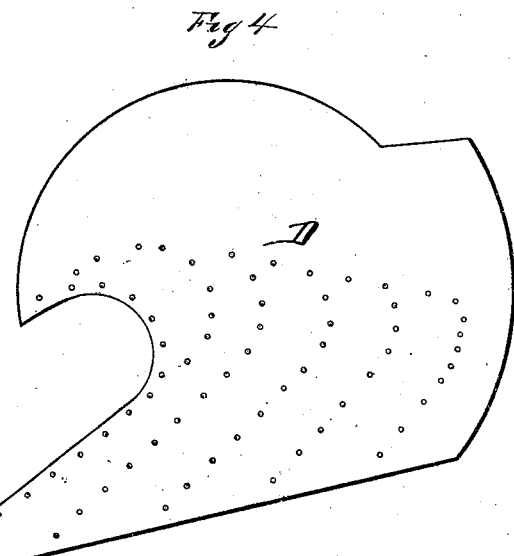

Figure 1 is a front elevation, and Fig. 2 a transverse vertical section, of my machine for rolling and laying off saw-teeth. Fig. 3 represents a part of the bar as rolled in the machine, and Fig. 4 represents a plate by which the rollers are laid off.

A A represent two rollers of suitable dimensions, journaled in a frame, B, and the journals on one side provided with cog-wheels C C, which gear into each other. At suitable intervals on each roller A is a circular shear-blade or cutter, *a*, inserted permanently in any suitable manner in the rollers to cut the bar up into teeth as it is rolled out. At one end of each roller are made depressions *b b*, of suitable size and shape to form a bead or rib on the saw, as described in another application for patent by me, the said depressions being made tapering, both in depth and width, to correspond with the desired shape of the bead or rib. Pins *x x* are inserted in the rollers A A, to mark the bar, as it goes through between them, the shape of the tooth, and also for marking the tooth how it should be worn up by the operator. In Fig. 3 I have shown a portion of a bar thus cut and marked. The same marking may be accomplished by turning the rollers a little larger than needed for forming the body of the tooth, and then cut out the body of the rollers to the proper size, leaving small raised ribs on them to dent and mark the tooth. When pins are used, the rollers are laid off by means of a right and a left hand plate, one of which, D, is shown in Fig. 4. These plates are cut out the exact shape of the tooth, and provided with small holes, through which the pins may be passed into the roller.

Having thus fully described my invention, what I claim as new, and desire to secure by Letters Patent, is—

The rollers *a a*, geared together in a frame, and provided with cutters *a a*, depressions *b b*, and pins *x x*, or their equivalents, for the purposes herein set forth.

In testimony that I claim the foregoing I have hereunto set my hand this 11th day of October, 1873.

NELSON JOHNSON.

Witnesses:
S. COUNTRYMAN,
SAMUEL DENNIS.